Aug. 24, 1948.  
F. RIEBER  
TEMPERATURE RESPONSIVE VARIABLE  
FREQUENCY OSCILLATOR  
2,447,816

Filed Jan. 29, 1944

INVENTOR.

FRANK RIEBER

BY

ATTY.

INVENTOR.
FRANK RIEBER

Patented Aug. 24, 1948

2,447,816

UNITED STATES PATENT OFFICE 2,447,816

TEMPERATURE RESPONSIVE VARIABLE FREQUENCY OSCILLATOR

Frank Rieber, New York, N. Y., assignor to Interval Instruments, Inc., New York, N. Y., a corporation of New York Application January 29, 1944, Serial No. 520,198

11 Claims. (Cl. 250—36)

This invention relates to thermo-responsive devices constructed and arranged to respond to variations in temperature and to create electrical values accurately corresponding thereto, which can in turn be used to operate any form of device desired, such, for example, as apparatus for visibly indicating or recording temperatures locally or at a distance, as well as devices for effecting a thermal control, as for example of a heating system.

It is an object of this invention to provide a device in which temperature variations to be measured are used accurately to modulate the frequency of a pulsating current, whereby the controlling characteristics of the electrical value created, that is the frequency, is independent of variations of line voltage or of other collateral factors.

It is a further object to produce a device of the greatest simplicity and ruggedness which will continue to give an accurate response to temperature variations in spite of roughness of handling or of external conditions within reasonable limits.

It is a further object to provide a system in which the temperature responsive element may, if desired, become completely closed and hermetically sealed, but which nevertheless will be prompt in its reaction and sensitive in its response.

It is a further object to produce a device in which indications or other utilization of the current produced will accurately correspond to the temperature measured, regardless of the distance to which the current may be transmitted, and of the conditions of the circuit by which it is transmitted, that is, a device which will accurately transmit the response even though it be to a considerable distance or through a relatively poor conducting circuit.

It is a further object to produce an apparatus, the temperature responsive parts of which may be encompassed within an extremely small bulk, and yet which may be used accurately and reliably to produce electrically accurate responses of any magnitude.

The invention accordingly comprises a device possessing the features, properties and the relation of elements which will be exemplified in the articles hereinafter described and the scope of the application of which will be indicated in the claims.

For a fuller understanding of the nature and objects of the invention, reference should be had to the following detailed description, taken in connection with the accompanying drawings, in which:

Fig. 1 designates one form of apparatus embodying this invention connected into a suitable amplifying device.

Figure 1:
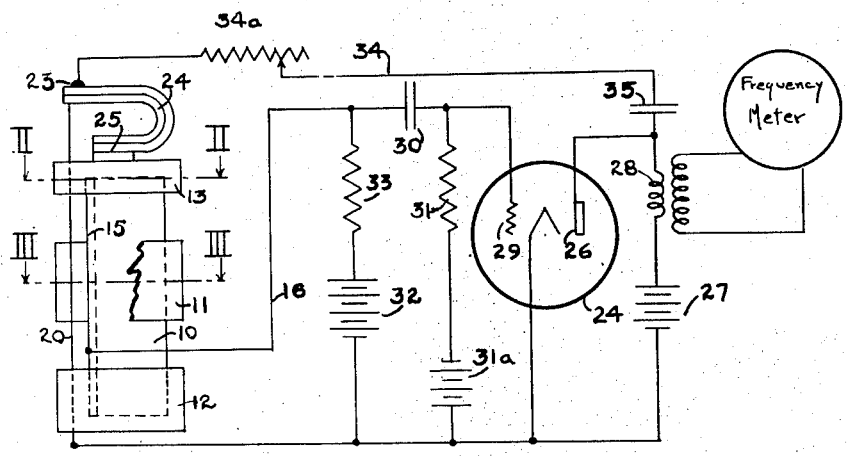

The invention of this application consists primarily in a mechanism responsive to temperature changes and means for varying the frequency of an alternating current in exact and predetermined relation thereto. This latter will generally comprise an oscillator and means controlled by the temperature for determining the frequency of oscillation.

It has heretofore been proposed to use a vibrating flat rod as the control element of an oscillating circuit, but such systems have lacked accuracy, sensitiveness and reliability. In general, when the rod is magnetic and vibrates toward and from the magnet, the field of force acting upon it varies greatly as it vibrates toward the magnet pole, so that the rate of vibration varies with changes in amplitude of vibration, and the resultant alternating current thus not only has an uncertain frequency, but also an unduly distorted wave. And when the frequency is taken to the oscillating device by a contact, the contacts are unreliable and cause trouble, but if the frequency be taken off by electromagnetic means, we introduce a second magnetic field which interferes with the timing of the rod.

With all such systems, the tuning of the apparatus is so broadened that the full sensitiveness of the apparatus is not attained.

In my copending application filed of even date herewith, and bearing Serial Number 520,197, which has become abandoned, I have disclosed an oscillator in which a vibrating wire is arranged to vibrate transverse to a magnetic field, so that the forces exerted upon it by the field are constant, and the frequency from the field is taken electrostatically in a manner free from any possibility of distorting the response of the wire. In that apparatus the frequency is altered by varying the tension on the wire.

To secure accuracy of response of such a wire, it is essential that the wire vibrate at one frequency only, whether it be the fundamental or a single harmonic, since other vibrations alter the frequency by imposing increased tension on the wire. We have here selected for illustration the vibration of the wire at its fundamental frequency, and for this purpose it is important that the motor force act upon a considerable portion of the wire, at least, preferably more than a third, to prevent stimulation of the third and higher harmonics, and this motor force should be symmetrically disposed to prevent the introduction of undesired harmonics. If a higher harmonic be selected, the same principles will obtain if we consider the unit portion of the wire between nodes as the wire.

It is also important that the motor force acting upon the wire shall be substantially uniform and shall be exerted at the same point in the movement of the wire at each successive impulse, since otherwise variations in amplitude will occur with resultant changes in frequency because the greater the amplitude, the more tension on the wire and hence the higher the frequency.

A further important factor is that the take-off, that is, the mechanism by which the vibration reacts on the oscillator system to determine its frequency, shall be such as to respond only to the chosen harmonic, which in general means that it shall respond to the vibration of the desired unit of the wire as a whole, and insofar as possible cancel out vibrations at multiple or fractional frequencies. That is if the fundamental be the chosen frequency, the take-off should be such as to cancel out response to multiple frequencies. This can be accomplished by making the take-off extend symmetrically through substantially the entire length of the wire so that vibrating fractions will insofar as possible neutralize each other in their effect on the oscillating system.

It is also important that the motor force shall be symmetrical transverse to the direction of motion, since a motor force which acts non-uniformly encourages undesired harmonics.

In accordance with this invention, that principle is applied to temperature measurements.

In the drawings the numeral 10 designates an insulator of Bakelite or other suitable insulator surrounded at its central portion by a C-shaped permanent magnet 11 and having end caps 12 and 13. This insulator has two vertical grooves 14 adjacent to each other, leaving a central ridge along which is placed a linear conductor or wire 15. This may readily be formed by imbedding a short length of wire in the material of the insulator, finally grinding off the extreme outer face to leave the wire exposed. An external lead 16 connected to the wire 15 serves to connect it with the external circuit.

Each of the end caps 12 and 13 is provided with inward projections 17 fitting within the grooves 14 spaced by a slot 18—19, to receive and position the opposite ends of a vibrating wire 20, to maintain it parallel to and with its position of rest a fixed distance from the wire 15. This wire 20 is firmly attached at 21 to the lower cap 12 by a suitable plate, but it passes through the slot in the upper cap 13 where it is connected at 23 to the free end of a thermo responsive member such as the bimetallic strip 24 which itself is affixed to the cap 13 at 25, in position to keep the wire 20 in its proper relation to the wire 15. The construction is such as to place the vibrating wire midway between the magnet poles.

The device thus far described is connected to an amplifying system in such a manner that the frequency of the oscillator is determined by the electrostatic capacity between the wires 15 and 20, and to feed the oscillating current so generated through the wire 20. The construction here shown is diagrammatic of such an oscillator, although at the frequencies I prefer to use, a greater degree of amplification will ordinarily be required than this symbolic circuit will afford. These principles are well known and do not require further exposition here.

The numeral 24 designates a vacuum tube having its plate 26 fed by a battery 27 through the primary of a transformer 28. The grid 29 is connected to a lead 16 from the wire 15 through a condenser 30, and to the ground through a grid leak 31 and a sufficient grid bias battery 31a to maintain proper potential on the grid. A battery 32 supplies potential to the wire 15 through a high resistance 33. As will be understood, the variations of potential upon the electrode 20 are due to the resistance drop in resistance 33, of the current flowing into the electrode 20, due to its changes in capacity. Oscillation is maintained by connecting the plate 26 through condenser 35 with a lead 34 connected to the upper end of the wire 20 through a feed back control resistor 34a.

With this arrangement it will be seen that the variation in capacity between the wires 15 and 20 will vary the charge upon the wire 15. The electrical quantities resulting from these fluctuations will be amplified by the amplifying system to the transformer primary 28, and are fed back to the oscillating wire through the condenser 35, to keep it in oscillation.

Any desired apparatus may be utilized to measure the frequency appearing in the transformer 28. This is schematically shown in the drawing in the form of a frequency meter placed across the secondary of the transformer 28.

Variations in temperature will cause the bimetallic strip to make corresponding changes in the tension upon the wire, thus changing the frequency of the oscillating system in exact accordance therewith. The thermal expansion of the wire 20 and of the block 10 can be allowed for in calibrating the instrument, and do not introduce any errors.

It will also be noted that the bimetallic strip does not sensibly bend under temperature, being restrained by the sensitive wire. The property here relied upon is the increased stress exerted by the strip on the wire while it is hot, which stress is substantially linear. Nevertheless the exact lateral position of the wire relative to the linear electrode is maintained by the slots in the end caps.

Figure 4:
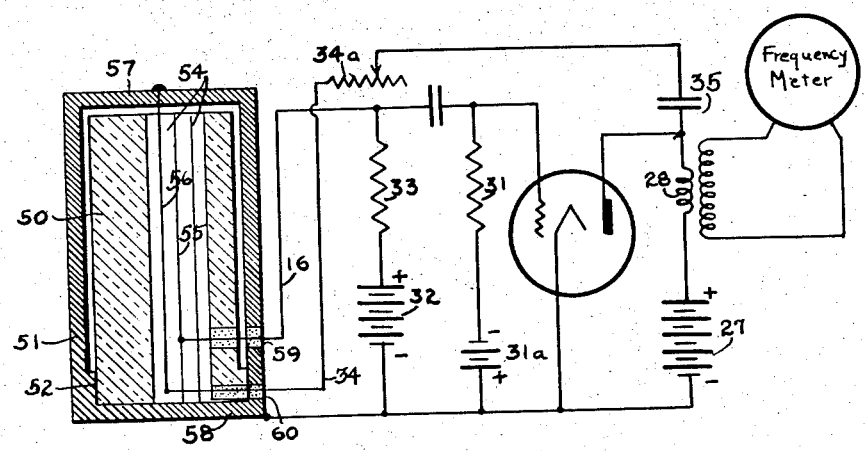
Fig. 4 is a modified form of apparatus.
Figure 5:
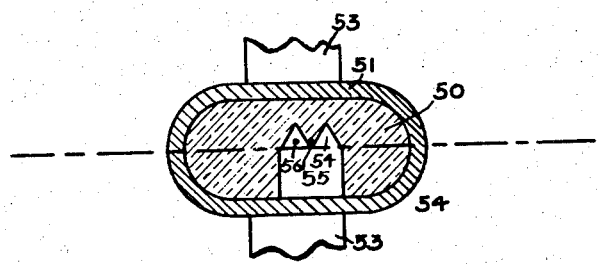
Fig. 5 is a section on the line 5—5 of Fig. 4.

In the form of the invention disclosed in Fig. 4, the insulating member 50 is surrounded by a metallic shell 51, to which it is attached at the lower end, as shown at 52. I have in this embodiment shown the member 50 and the shell 51 as elongated in cross section, since the permanent magnet poles 53 are shown as placed outside the shell 51 and it is advantageous to reduce the distance between the poles to increase the magnetic field.

The insulator 50 is provided with adjacent grooves 54 providing a ridge for supporting the linear conductor 55 which is connected to the amplifier system by the lead 16 which is insulated from the shell.

The vibrating wire 56 is attached at its lower end to insulator 50, and this end is connected to the amplifier by lead 34, and the upper end of the wire is attached to the shell 51 and through the shell to the grounded side of the amplifier.

The shell 51 is shown as closed at both ends by ends 57 and 58, and the leads 16 and 34 may be taken out through insulators 59 and 60, so that the shell can be completely sealed. In use it need only be placed in a magnetic field across its short diameter and the leads connected to the amplifying system.

The shell is preferably made of some metal, such as an aluminum alloy, having a high coefficient of expansion relative to the wire, which may be made of tungsten. In any case, the length of the shell, which is itself the thermoresponsive element, will be so adjusted to the length of the wire that the elastic limit of the wire is not passed within the range of temperatures to be measured. In this manner the instrument may be constructed with any scale range desired within the linear portion of the curve of the expansion of the metal.

Figure 2:
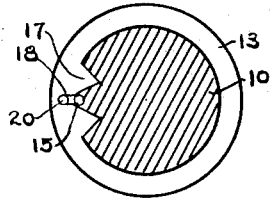
Fig. 2 is a section on the line 2—2 of Fig. 1.
Figure 3:
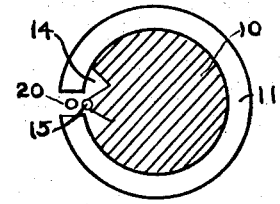
Fig. 3 is a section on the line 3—3 of Fig. 1.

In the structure of Figs. 1 to 3, the temperature response is due to the characteristics of the bimetallic strip. The thermal expansion of the insulator and of the wire tend to counterbalance each other, and the difference between the two will be taken into account in calibrating the instrument.

When it is desired to translate the alternating current into terms of visual indication, or of mechanical motion, any form of frequency measuring device may be employed which is sensitive enough to meet the requirements. I prefer, however, to employ an apparatus which is itself dependent on a vibrating wire, as is disclosed in my copending application for a transducer, filed of even date herewith and bearing Serial No. 520,196, since such an instrument is extremely sensitive and reliable and thus makes possible extremely accurate readings of temperature, and moreover by such an instrument the temperature may be read direct.

Since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A device of the character described, comprising a wire, means for maintaining said wire taut, including a temperature responsive element for varying the tension of said wire in accordance with temperature changes, terminals connected to the ends of said wire by which current may be led through said wire, an electrode parallel to and closely adjacent to, but insulated from said wire, a terminal connected to said electrode, and a magnet having its poles disposed in position to establish magnetic lines of force symmetrical about said wire and transverse to the plane defined by said wire and said electrode.

2. A device of the character described, comprising a wire, an insulating member, means carried by the insulating member for supporting both ends of said wire to maintain said wire taut, including a temperature responsive element for varying the tension of said wire with temperature changes, a rigid linear electrode supported by said insulating member parallel to and closely adjacent to, but insulated from said wire, means for establishing a field of magnetic force about said wire, and a terminal connected to said electrode.

3. A device of the character described, comprising a wire, an insulating member, means carried by the insulating member for supporting both ends of said wire to maintain said wire taut, including a temperature responsive element constructed and arranged to change the tension on the wire with every temperature change, an electrode adjacent to the wire, means for establishing on the electrode a potential varying with the capacity between the electrode and the wire, an amplifying system, and means for connecting said electrode to the amplifying system and means for feeding a pulsating current from said amplifying system through said wire.

4. A device of the character described, comprising a magnet, a wire transverse to the field of said magnet and having a temperature responsive means to vary the tension on said wire with temperature changes, an electrode parallel to said wire and spaced therefrom in a direction transverse to the magnetic field, means for imposing a variable charge on said electrode relative to said wire in accordance with the capacity between them, and an oscillating system connected to said electrode to have its frequency of oscillation determined by said variable charge, and having means to feed alternating current of the oscillating frequency through said wire.

5. A device of the character described, comprising a magnet, a wire transverse to the field of said magnet and having a temperature responsive means to vary the tension on said wire with temperature changes, a rigid linear electrode parallel to said wire and spaced therefrom in a direction transverse to the magnetic field, a battery connected through a high impedance to said electrode for imposing a variable charge on said electrode relative to said wire in accordance with the capacity between them, and an oscillating system connected to said electrode to have its frequency of oscillation determined by said variable charge, and having means to feed alternating current of the oscillating frequency through said wire.

6. A container, a wire extending longitudinally within said container, having one end attached to one end of said container and the other end attached to the other end of said container through the medium of an insulator, said container having a temperature coefficient of expansion materially different from that of the wire, and an electrode insulating means for supporting said electrode parallel to and adjacent to the wire, of substantially the same length, said container completely enclosing said wire, and said electrode.

7. A container, a wire extending longitudinally within said container, having one end attached to one end of said container and the other end attached to the other end of said container through the medium of an insulator, said container having a temperature coefficient of expansion materially different from that of the wire, an electrode insulating means for supporting said electrode parallel to and adjacent to the wire, of substantially the same length, said container completely enclosing said wire, and said electrode, and means for establishing a magnetic field transverse to the plane of said wire and electrode.

8. A container, a wire extending longitudinally within said container, having one end attached to one end of said container and the other end attached to the other end of said container through the medium of an insulator, said container having a temperature coefficient of expansion materially different from that of the wire, an electrode insulating means for supporting said electrode parallel to and adjacent to the wire, of substantially the same length, said container completely enclosing said wire, and said electrode, and means external to said container for establishing a magnetic field transverse to the plane of said wire and said electrode.

9. A vibratable wire, a frame, means for supporting one end of said wire from said frame, a bi-metallic thermal responsive element carried by said frame for supporting the other end of said wire constructed and arranged to vary the tension on said wire in response to temperature changes, an oscillator, and means controlled by the vibration of said wire for determining the frequency of said oscillator, and means including connections between said oscillator and said wire for maintaining said wire in oscillation.

10. A device for measuring temperature adapted for use in a magnetic field with an oscillating circuit comprising a frame, a vibratable wire, means upon said frame for supporting one end of said wire from said frame, a bi-metallic thermal responsive element carried by said frame for supporting the other end of said wire constructed and arranged to vary the tension on said wire in response to thermal changes, and electrodes for feeding current to said wire.

11. A vibratable wire, a member responsive to temperature variations for supporting both ends of said wire from said member, including an insulator whereby variations in temperature vary the tension in said wire, an oscillator, and means controlled by the vibration of said wire for determining the frequency of said oscillator, and means including connections between said oscillator and said wire for maintaining said wire in oscillation.

FRANK RIEBER.

REFERENCES CITED

The following references are of record in the file of this patent:

UNITED STATES PATENTS

| Number | Name | Date |
| --- | --- | --- |
| 315,164 | Porter | Apr. 7, 1885 |
| 904,558 | Ozias | Nov. 24, 1908 |
| 1,878,109 | Clark | Sept. 20, 1932 |
| 1,995,305 | Hayes | Mar. 26, 1935 |
| 2,027,074 | Miessner | Jan. 7, 1936 |
| 2,050,674 | Stover | Aug. 11, 1936 |
| 2,138,941 | Roundanez | Dec. 6, 1938 |
| 2,220,350 | Purington | Nov. 5, 1940 |
| 2,236,985 | Bartelink | Apr. 1, 1941 |
| 2,265,011 | Siegal | Dec. 2, 1941 |
| 2,266,114 | Bartlett | Dec. 16, 1941 |
| 2,302,895 | Root | Nov. 24, 1942 |
| 2,318,936 | Fisher | May 11, 1943 |
| 2,377,869 | Elliott | June 12, 1945 |

FOREIGN PATENTS

| Number | Country | Date |
| --- | --- | --- |
| 155,854 | Great Britain | 1921 |
| 622,581 | Germany | Dec. 2, 1935 |